United States Patent
Jonik et al.

(10) Patent No.: US 11,960,472 B2
(45) Date of Patent: *Apr. 16, 2024

(54) SYNCHRONIZING CONTENT WITH THIRD-PARTY APPLICATION

(71) Applicant: Snap Inc., Santa Monica, CA (US)

(72) Inventors: Daniel Jonik, Seattle, WA (US); Kent Tam, Beverly Hills, CA (US); Bradley Baron, Seattle, WA (US); Benjamin Ralph Hollis, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,675

(22) Filed: Oct. 12, 2022

(65) Prior Publication Data
US 2023/0033677 A1 Feb. 2, 2023

Related U.S. Application Data

(63) Continuation of application No. 16/801,805, filed on Feb. 26, 2020, now Pat. No. 11,500,850.

(51) Int. Cl.
*G06F 16/23* (2019.01)
*G06F 16/27* (2019.01)

(52) U.S. Cl.
CPC ...... *G06F 16/2365* (2019.01); *G06F 16/2329* (2019.01); *G06F 16/275* (2019.01)

(58) Field of Classification Search
CPC . G06F 16/2365; G06F 16/2329; G06F 16/275
USPC ....................................................... 707/613
See application file for complete search history.

(56) References Cited

U.S. PATENT DOCUMENTS

| 8,788,881 B2 * | 7/2014 | Salomon ............ G06Q 20/3224 714/18 |
| 2009/0327354 A1 | 12/2009 | Resnick et al. |
| 2015/0169615 A1 * | 6/2015 | Batchu .................... H04W 4/50 707/624 |
| 2017/0359462 A1 | 12/2017 | Harris et al. |

(Continued)

OTHER PUBLICATIONS

U.S. Appl. No. 16/801,805, filed Feb. 26, 2020, Synchronizing Content With Third-Party Application.

(Continued)

*Primary Examiner* — Michael Pham
(74) *Attorney, Agent, or Firm* — Schwegman Lundberg & Woessner, P.A.

(57) ABSTRACT

Systems and methods are provided for synchronizing messages. The systems and methods include operations for: identifying a difference between a current state of a messaging application and a shared synchronization database, wherein the shared synchronization database is updated via a third-party application in response to the third-party application receiving, from a server, a notification related to the messaging application, the messaging application and the third-party application being implemented on a client device; retrieving information from the shared synchronization database to update the current state of the messaging application based on the identified difference; and transmitting, to the server by the messaging application, a request for content based on the update to the current state of the messaging application.

20 Claims, 7 Drawing Sheets

(56) References Cited

U.S. PATENT DOCUMENTS

2018/0341693 A1 11/2018 Shao
2020/0112606 A1 4/2020 Nanduri et al.

OTHER PUBLICATIONS

"U.S. Appl. No. 16/801,805, Final Office Action dated Apr. 14, 2022", 16 pgs.
"U.S. Appl. No. 16/801,805, Non Final Office Action dated Oct. 6, 2021", 15 pgs.
"U.S. Appl. No. 16/801,805, Notice of Allowance dated Jul. 13, 2022", 9 pgs.
"U.S. Appl. No. 16/801,805, Response filed Jan. 4, 2022 to Non Final Office Action dated Oct. 6, 2021", 10 pgs.
"U.S. Appl. No. 16/801,805, Response filed Jun. 14, 2022 to Final Office Action dated Apr. 14, 2022", 10 pgs.

* cited by examiner

SYNCHRONIZING CONTENT WITH THIRD-PARTY APPLICATION

CLAIM OF PRIORITY

This application is a continuation of U.S. patent application Ser. No. 16/801,805, filed Feb. 26, 2020, which is incorporated herein by reference in its entirety.

TECHNICAL FIELD

The present disclosure generally relates to the technical field of social networks. In particular, the present embodiments are generally directed to managing message synchronization.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
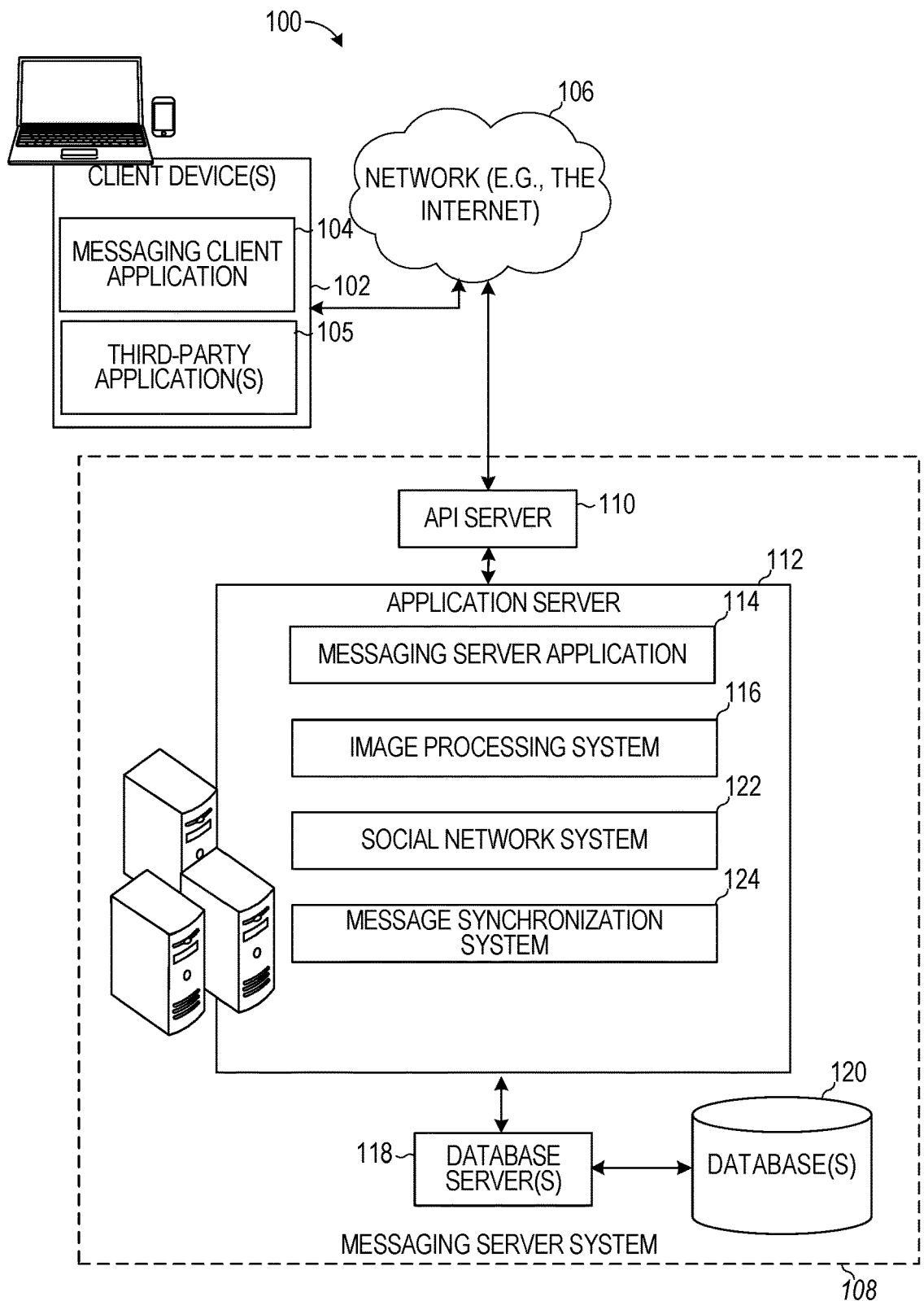
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on a user device, such as a mobile device. Such media content is typically exchanged in chat sessions between users. Sometimes users log on and log off a server that maintains the contents of the chat sessions. In order to ensure that the latest chat messages, that were exchanged in the chat session while the user device has been disconnected from the server, are presented to the user, a user device synchronizes with the server. Typically, the server will send the content of all the messages that were exchanged while the user device was disconnected from the server. Some of these messages are rich in large-sized content, such as videos and images. Synchronizing such content between a server and a user device consumes a great deal of processing resources and network bandwidth which makes synchronization sessions operate inefficiently. Also, synchronizing such content can take a long time which further delays presenting the latest chat messages to the user and can end up frustrating the users.

In some cases, a dedicated operating system process, such as a push notification application, receives messages or data corresponding to a messaging application. For example, a first user may send a message, via a messaging application of a first user devices of the first user to a second user. A messaging application of a second user device of the second user may be inactive when the first user sends such a message. In such circumstances, the push notification application of the operating system of the second user device may receive and present the message to the second user. Typically, the push notification application does not communicate with the messaging application and works independently of the messaging application. As such, the messaging application is not informed about the receipt of the message from the first user. So when the messaging application ultimately synchronizes its content with the server, the messaging application may request content from the server that may have already been delivered to the second user device through alternate means, such as by way of the push notification application. This results in wasted bandwidth and processing resources in performing duplicative work. In this case, the duplicative work is the receipt of a message that has already been provided to the second user device by other means.

The disclosed embodiments improve the efficiency of using the electronic device by providing a system that efficiently synchronizes content between a server and a user device. According to the disclosed system, only content that differs between the user device and the server and that has not already been sent to a third-party application, such as a push notification application, or a messaging application on the user device is transmitted to the user device in a synchronization session. In this way, if one application, such as a third-party application, on the user device obtained content while a messaging application is offline, such content can be shared with the messaging application, and need not be requested to be provided by the messaging application from the server. As such, the server avoids sending duplicate information to the user device when the messaging application of the user device ultimately connects back to the server. Specifically, the disclosed system receives, from a server by a third-party application implemented on a client device, a notification related to a messaging application and updates, by the third-party application, a shared synchronization database based on the notification. The disclosed system identifies a difference between a current state of the messaging application and the shared synchronization database and retrieves information from the shared synchronization database to update the current state of the messaging application based on the identified difference. Then, the messaging application transmits, to the server, a request for content based on the update to the current state of the messaging application and does not request content that was already obtained from the shared synchronization database via the third-party application.

Rather than sending the entire contents of the messages exchanged as part of a communication session after a user device disconnected from a server, the disclosed system only sends those messages that the user device did not already obtain using a different application, such as a push notification application. Specifically, a messaging application on the user device may end a connection with a server and may receive a first set of messages from a push application. The push application may update a shared synchronization database with the first set of messages. Later, the messaging application, prior to connecting back to the server to receive a set of synchronization data, identifies a set of data the messaging application is missing that is included in the shared synchronization database. The messaging application updates the missing data and requests from the server any further updates not including the missing data that was obtained from the synchronization database. This increases the efficiencies of the electronic device by reducing processing times and network bandwidth needed to accomplish a task.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a message synchronization system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application. In some cases, the third-party application 105 is an operating system process (e.g., a push notification application) that handles push notifications for various applications installed on the client device 102. The push notification application is configured to receive messages from one or more servers and automatically present the received messages to the user. The messages may be received out-of-band and without a synchronization or refresh operation being performed by the client device 102.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message synchronization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message synchronization system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The message synchronization system 124 manages synchronization of messages exchanged in a communication session. For example, the message synchronization system 124 establishes a communication session between a plurality of users (e.g., a chat session in which multiple chat messages are exchanged). The messaging client application 104 implemented on the client device 102 communicates with the message synchronization system 124 to receive messages transmitted as part of the communication session. Specifically, messages are sent from one user to another via the message synchronization system 124. The message synchronization system 124 keeps track of all the messages that are exchanged and sends updates to client devices 102 that are connected to the message synchronization system 124.

In some cases, the message synchronization system 124 stores data relating to the messaging client application 104 in a shared synchronization database. The shared synchronization database may be stored locally on the client device 102 and/or on a remote server. The data may include identifiers of messages that were received by a third-party application 105. The data may also include identifiers of messages received by the messaging client application 104.

For example, the messaging client application 104 may go offline (e.g., because a user closed the application and/or because of loss of Internet connectivity). Once the same messaging client application 104 connects back to the message synchronization system 124, the message synchronization system 124 determines whether the shared synchronization database includes additional messages were exchanged or sent by users in the communication session. Such additional messages may have been received by the third-party application 105 and have been stored in the shared synchronization database. In some cases, the message synchronization system 124 retrieves the timestamp of the last time the messaging client application 104 received an update from the messaging server system 108. The message synchronization system 124 compares the timestamp to timestamps of messages stored in the shared synchronization database to identify a set of messages that were exchanged after the timestamp of the last time the messaging client application 104 received the update. Namely, the message synchronization system 124 identifies timestamps that follow the timestamp of the last time the messaging client application 104 was synchronized or refreshed.

The message synchronization system 124 obtains the set of messages from the third-party application 105 and/or from the shared synchronization database. The message synchronization system 124 locally updates the current state of the messaging client application 104 with the obtained set of messages.

The message synchronization system 124 then generates synchronization data based on the current state of the messaging client application 104. Specifically, the message synchronization system 124 generates a request to synchronize messages with the server 108 based on the timestamps of the messages that were stored in the shared synchronization database rather than the last timestamp of when the last time the messaging client application 104 refreshed or synchronized content with the server 108. The server 108 determines whether additional messages or content were exchanged following the latest timestamp of the messages obtained from the shared synchronization database. The server 108 provides to the messaging client application 104 any messages that are missing from the updated state of the messaging client application 104, such as any additional messages or content were exchanged following the latest timestamp of the messages obtained from the shared synchronization database. In some cases, the server 108 does not find any messages that are missing from the messaging client application 104. In such cases, no updated information is provided to the messaging client application 104. In some cases, after updated content is received by the messaging client application 104 from the server 108, the shared synchronization database is updated with this information retrieved from the server 108.

In some cases, the synchronization data includes a vector of sequence numbers of messages that were exchanged. In some implementations, the vector identifies users who participate in the communication session and sequence numbers of messages sent by such users. In some cases, the vector is a matrix in which columns of the matrix represent different participants of the communication session and rows of the matrix represent sequence numbers of messages sent by the different participants.

The messaging client application 104 obtains the synchronization data including the vector from the shared synchronization database. The messaging client application 104 generates a vector that represents messages already received by the messaging client application 104 that were previously exchanged in the communication session. The messaging client application 104 identifies differences between the vector generated by the messaging client application 104 and the synchronization data received from the shared synchronization database.

As an example, the messaging client application 104 compares the vector of sequence numbers generated by the messaging client application 104 and the vector of sequence numbers received from the shared synchronization database. The messaging client application 104 identifies one or more sequence numbers that are in the vector of sequence numbers received from the shared synchronization database and that are not in the vector generated by the messaging client application 104. The messaging client application 104 retrieves messages from the third-party application 105 corresponding to the identified one or more sequence numbers. The messaging client application 104 then generates a new vector of sequence numbers that includes the newly retrieved messages from the third-party application 105. The messaging client application 104 transmits a request to the server 108 to synchronize data based on the new vector of sequence numbers. The server 108 generates a vector of sequence numbers corresponding to a communication session of the messaging client application 104. The server 108 identifies differences between the vector received from the messaging client application 104 and the vector generated by the server 108. The server 108 then sends to the messaging client application 104 any messages that are associated with sequence numbers that are in the vector generated by the server 108 and that are not in the vector received from the messaging client application 104.

In this way, the given client device 102 may employ the techniques described herein to reduce network bandwidth by having the messaging client application 104 compare a vector of sequence numbers of messages exchanged in a communication session received from by the third-party application 105 and that are stored in a shared synchronization database to update the state of the messaging client application 104 before the messaging client application 104 communicates with the server 108 to obtain updates to a communication session.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
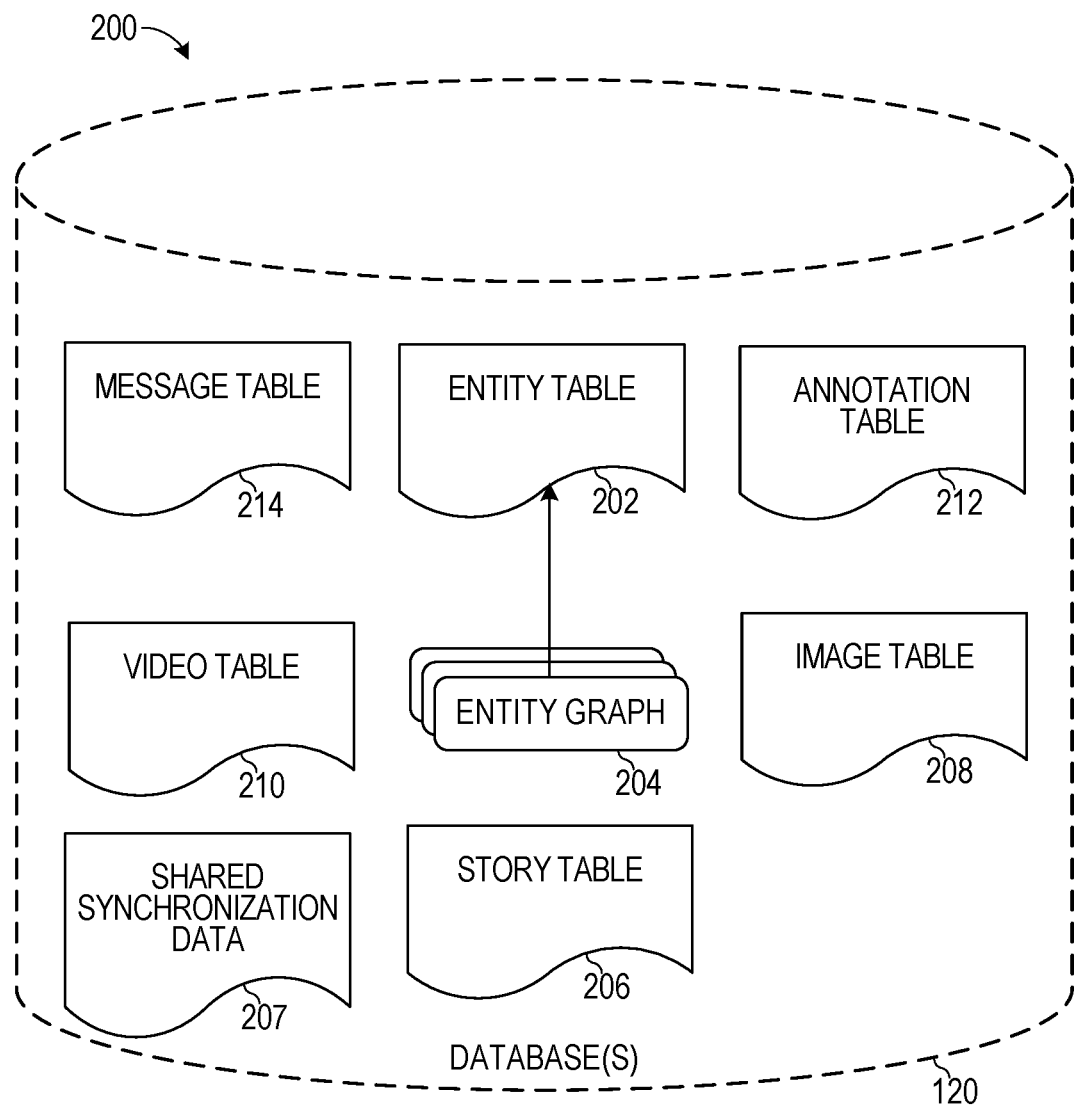
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Shared synchronization data 207 stores various information about messages exchanged in a communication session. Shared synchronization data 207 is a shared data storage that is accessible to the messaging client application 104 and to the third-party application 105. In some cases, the third-party application 105 receives a notification containing a message associated with the messaging client application 104. The messaging client application 104 not be informed about this message but the message may still be presented to the user. In response to receiving the message, the third-party application 105 stores an identifier of the message or notification (e.g., one or more sequence numbers or a vector of sequence numbers associated with the message) in the shared synchronization data 207.

The messaging client application 104 may access the shared synchronization data 207 to determine whether any notifications have been received by the third-party application 105 and which have not been updated or received by the messaging client application 104 (e.g., when the messaging client application 104 was offline, messages may have been received by the third-party application 105). The messaging client application 104 may update the local state of the communication session of the messaging client application 104 based on the updated information included in the shared synchronization data 207 before the messaging client application 104 requests to synchronize content with a remote source, such as server 108. After the messaging client application 104 updates its current state, the messaging client application 104 communicates with the server 108 to obtain further updates based on the updated current state of the messaging client application 104.

In some embodiments, the information stored in the shared synchronization data 207 includes a vector or matrix representing participants to a communication session and/or sequence numbers of messages sent by the respective participants associated with the messaging client application 104. Such messages may be received by the third-party application 105 but may not be received by the messaging client application 104 (e.g., because the messaging client application 104 is offline). The sequence numbers are associated with the messages and can be used to uniquely identify each respective message that is exchanged in the communication session. As an example, a client device 102 or messaging client application 104 may send a sequence number to the message synchronization system 124 and/or to the shared synchronization data 207 and request content or messages associated with the sequence number. The message synchronization system 124 and/or the shared synchronization data 207 identifies the contents or message associated with the received sequence number and sends the contents or message associated with the sequence number to the client device 102 or messaging client application 104. In some cases, the message synchronization system 124 uses the shared synchronization data 207 information to identify a set of synchronization data (e.g., a vector of sequence numbers) that includes identifiers of messages with timestamps that were received by the third-party application 105 after the last time the messaging client application 104 received a last message, was last updated, and/or was last connected to the message synchronization system 124.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
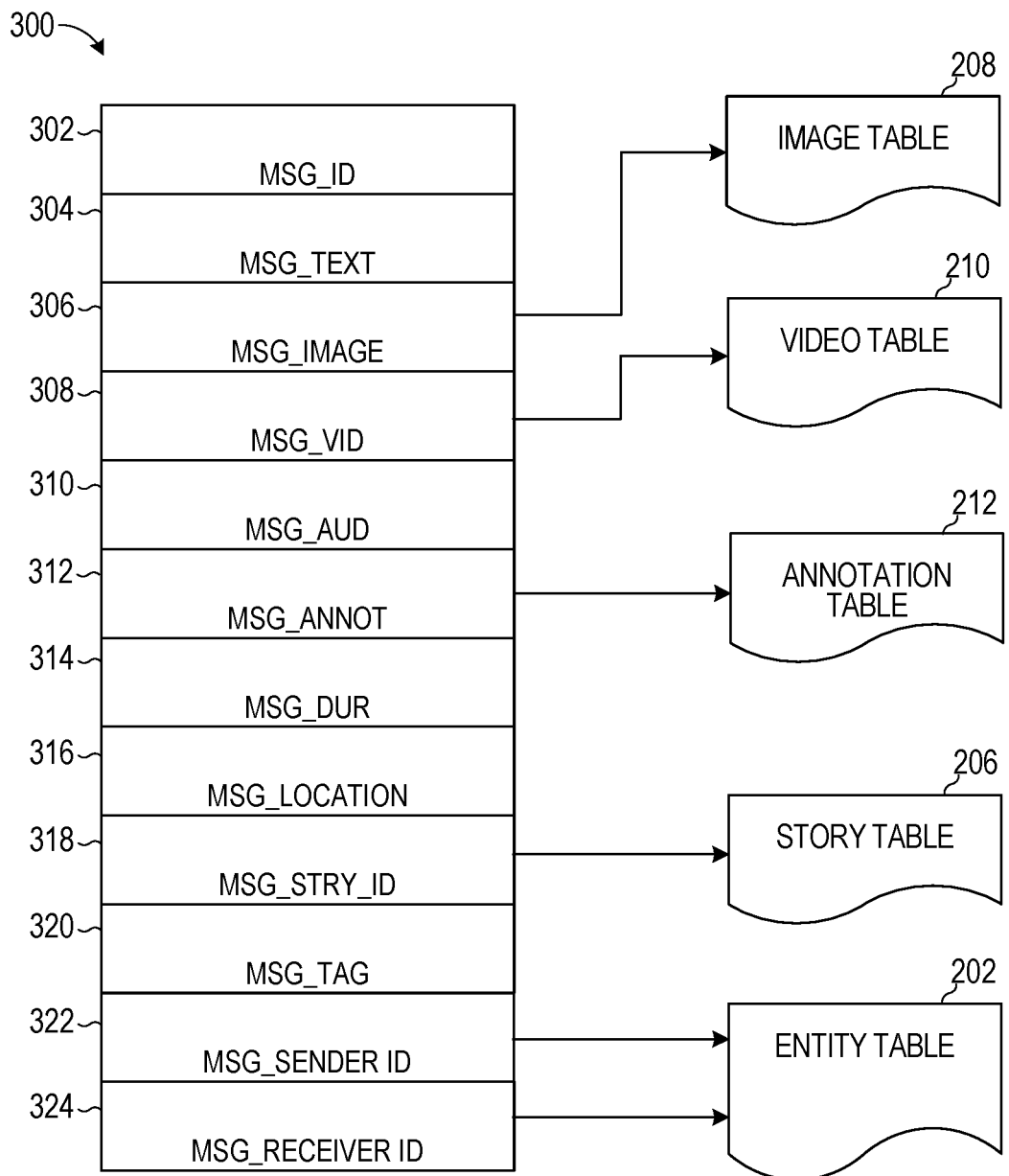
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
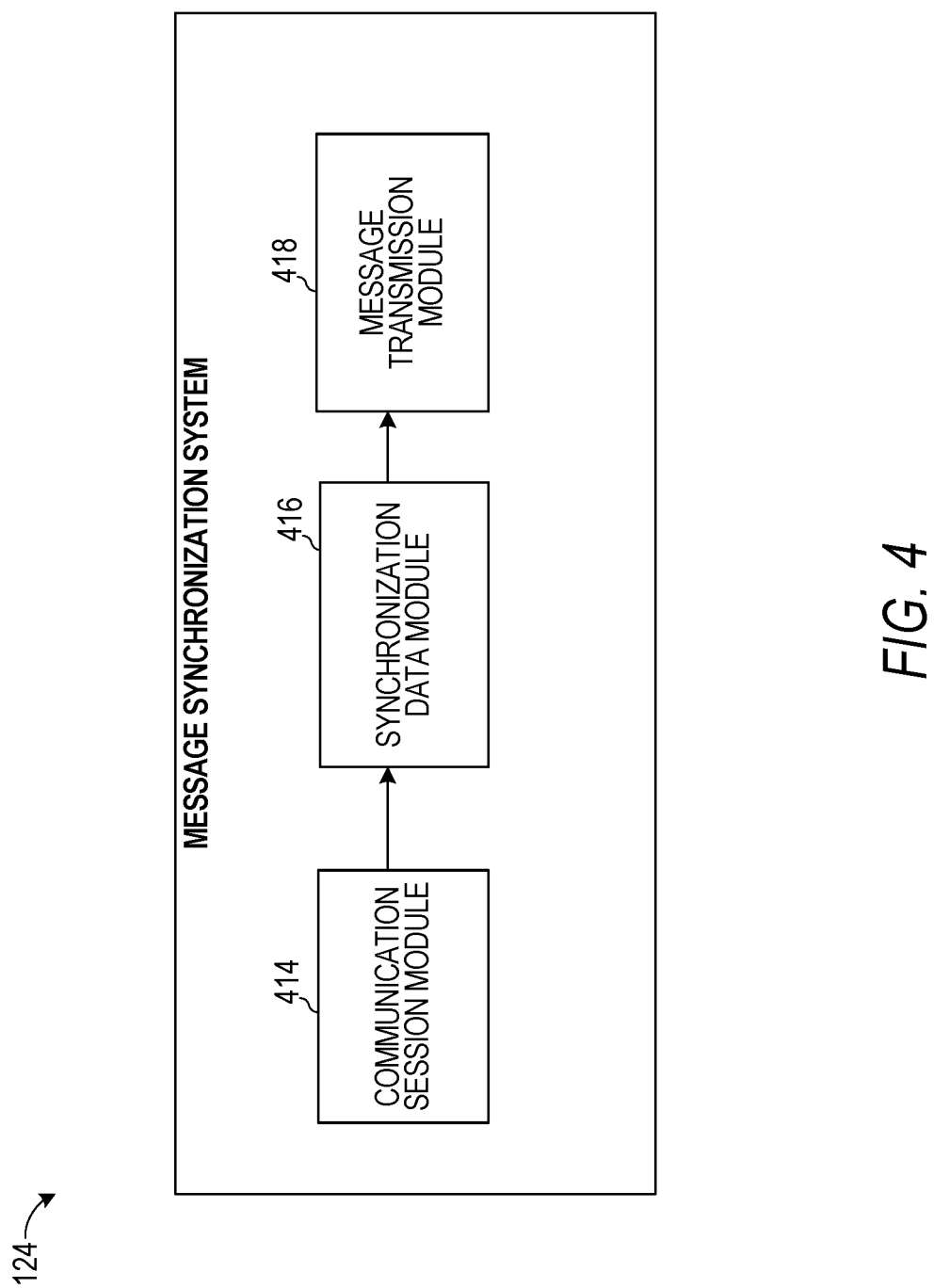
FIG. 4 is a block diagram showing an example message synchronization system, according to example embodiments.

FIG. 4 is a block diagram showing an example message synchronization system 124, according to example embodiments. Message synchronization system 124 includes a communication session module 414, a synchronization module 416, and a message transmission module 418. The communication session module 414 enables users to engage in a communication session to exchange messages with each other. In some cases, the communication session includes a group of three or more users in which case any message sent by one user is viewable by the other two users in the group. In some cases, the communication session includes only two users where one user sends messages to another user and vice versa.

After initiating a communication session using the communication session module 414, messages are transferred between users of the communication session using the communication session module 414. For example, the communication session module 414 receives a message from a first user in the communication session and marks the message for transmission to a second user in the communication session. The communication session module 414 stores the message along with various information indicating the recipient, the communication session identifier, a sequence number, an identifier of the sender, and a timestamp representing when the message was received. In some cases, in response to receiving a given message from a participant or sender, the communication session module 414 identifies a vector associated with the participant or sender and the value of the last sequence number that is stored in the vector. The communication session module 414 increments the value of the last sequence number that is stored to generate a new sequence number for the given message, associates the new sequence number with the given message, and adds the new sequence number to the vector stored for the sender or participant. In this way, each participant of the communication session is assigned a vector with sequence numbers representing messages sent by the respective participants.

When the second user logs into the message application, the communication session module 414 receives an identifier of the second user and determines whether any messages that have not been delivered yet to the second user and that are intended for the second user to receive. In some cases, the communication session module 414 receives a last update timestamp from the second user. The communication session module 414 searches the receive time of all the messages that are intended for receipt by the second user. The communication session module 414 selects those messages that have a receive time that is later than the last update timestamp. The communication session module 414 then sends all of the selected messages to the user device of the second user for presentation in the communication session of the message client application 104.

In some embodiments, after a given user of the communication session logs off, the communication session module 414 stores a timestamp indicating the last time an update was sent to the client device 102 of the user. In some embodiments, the communication session module 414 continuously updates the timestamp for a given client device 102 each time an update including new messages of the communication session is sent to the given client device 102. This way, the timestamp always represents the last time the given client device 102 was connected to and received a message from the communication session module 414.

In some embodiments, after the messaging client application 104 logs off, the given client device 102 of the given user may receive messages that are part of the communication session using a third-party application 105. For example, the third-party application 105 may be a push notifications application that is configured to receive messages out-of-band. Such an application may receive a message and present the message to the user while the messaging client application 104 is logged off. The third-party application 105 may store an indication of the received message in the shared synchronization data 207. For example, the third-party application 105 may store a participant identifier and one or more sequence numbers of the message received from the participant.

At a later time, the messaging client application 104 may determine a need to synchronize its content (e.g., when a polling period is reached or when a user requests to refresh the data of the messaging client application 104). At that time, the communication session module 414 instructs the synchronization module 416 to send the shared synchronization data 207 to the messaging client application 104 verify whether the messaging client application 104 has all of the messages that are part of the communication session before the messaging client application 104 communicates with the remote server to obtain updated messages.

In some embodiments, the synchronization module 416 generates a vector of sequence numbers and participant identifiers using the set of messages stored in the shared synchronization data 207. Namely, the synchronization module 416 generates a vector that includes sequence numbers or identifiers of messages that the synchronization module 416 identifies were exchanged during the period of time following the last time the messaging client application 104 last received an update or was last connected to the communication session module 414. The synchronization module 416 sends the synchronization data (e.g., the vector of sequence numbers) to the messaging client application 104.

The messaging client application 104 generates a local data set representing messages exchanged in the communication session that are locally stored. In some cases, the messaging client application 104 generates a vector that represents participants to the communication session and the sequence numbers of the messages sent by the participants that are stored on the messaging client application 104. The messaging client application 104 compares the received synchronization data with the current state of (e.g., a vector of sequence numbers of the communication session currently stored by) the messaging client application 104 to identify differences. For example, the messaging client application 104 compares the vector of sequence numbers received from the synchronization module 416 that are in the shared synchronization data 207 (including messages received by the third-party application 105) to the locally generated vector of sequence numbers of messages currently stored in the messaging client application 104. The synchronization module 416 compares the vector of sequence numbers received from the shared synchronization data 207 with a vector of sequence numbers generated by the messaging client application 104. The synchronization module 416 identifies any differences and automatically sends content or messages corresponding to the differences (e.g., sends messages corresponding to sequence numbers that are in the vector obtained from the shared synchronization data 207 that are not also in the vector received from the messaging client application 104). Namely, the messaging client application 104 updates the current state of the communication session with the updated content or messages corresponding to the differences.

The messaging client application 104 sends a request to the synchronization module 416 to obtain content from a remote server, such as server 108, for content associated with differences between the updated state of the messaging client application 104 and the current state maintained by the server 108. Specifically, the messaging client application 104 generates a new vector of sequence numbers representing the updated state of the messaging client application 104. The messaging client application 104 sends to the server 108 a request for messages associated with a set of sequence numbers that are not already included in the new vector of sequence numbers. Namely, the messaging client application 104 requests that the server 108 provide any messages exchanged in the communication session that were not previously stored by the messaging client application 104 and that were not previously received by the third-party application 105.

In response to receiving the request from the messaging client application 104, the server 108 sends via the message transmission module 418 one or more messages corresponding to the received request. For example, the synchronization module 416 instructs the message transmission module 418 to retrieve messages associated with the sequence numbers that are stored by the server 108 in connection with the communication session and that are not in the new vector of sequence numbers received from the messaging client application 104. The message transmission module 418 obtains the messages and updates the communication session that is stored and maintained locally and displayed to the user with the messages obtained from the message transmission module 418.

Figure 5:
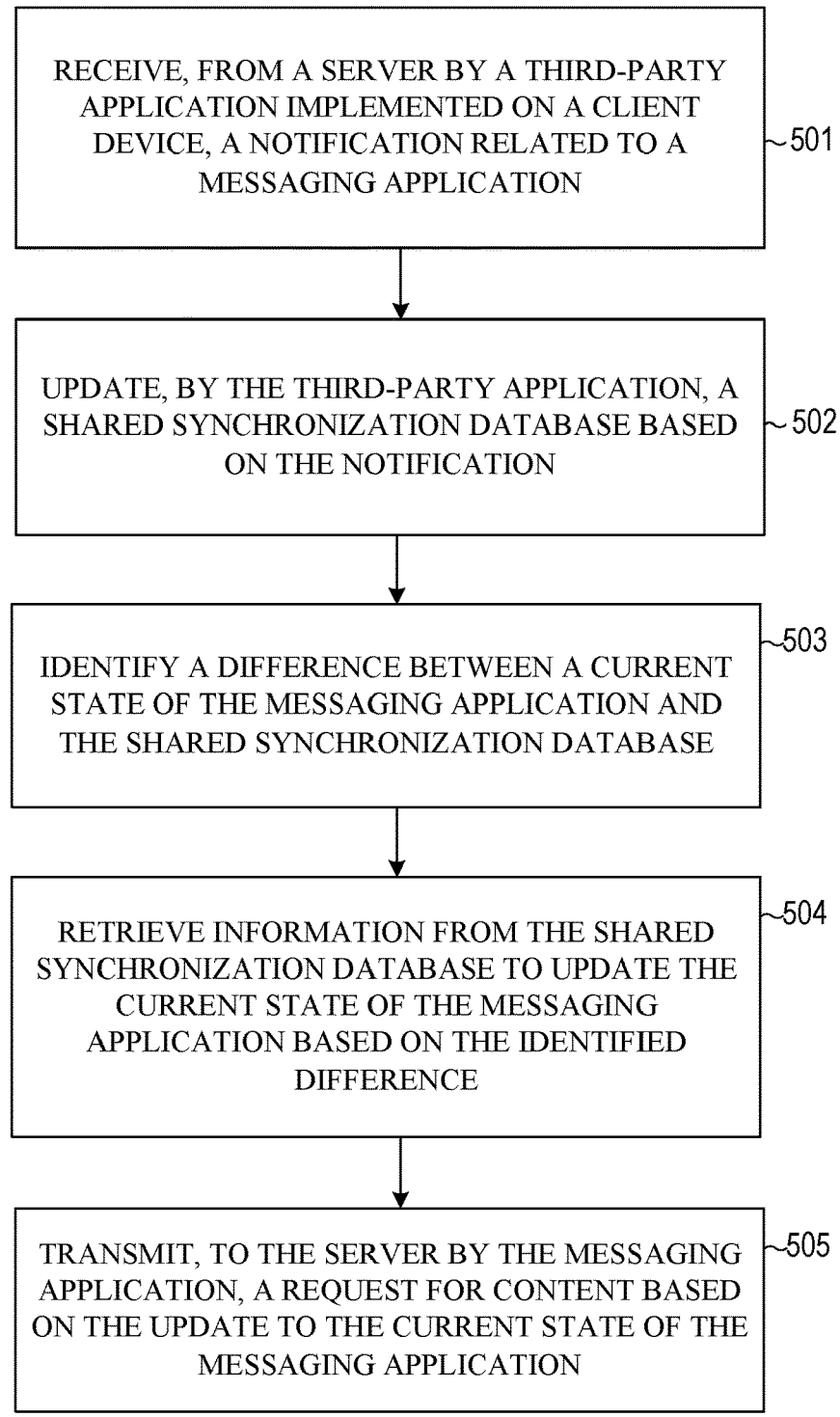
FIG. 5 is a flowchart illustrating example operations of the message synchronization system, according to example embodiments.

FIG. 5 is a flowchart illustrating example operations of the message synchronization system 124 in performing process 500, according to example embodiments. The process 500 may be embodied in computer-readable instructions for execution by one or more processors such that the operations of the process 500 may be performed in part or in whole by the functional components of the messaging server system 108, client device 102, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the computing system (e.g., client device 102) receives, from a server, by a third-party application implemented on the computing system a notification related to a messaging application. For example, the third-party application 105 receives a message from a server that includes a participant identifier of a user involved in a communication session and a sequence number of the message.

At operation 502, the computing system updates, via the third-party application, a shared synchronization database based on the notification. For example, the third-party application 105, such as the push notification application or process of the operating system of the computing system, presents a notification to the user of the computing system with the received message and updates the shared synchronization data 207 with information, such as the participant identifier and the sequence number of the message.

At operation 503, the computing system identifies a difference between a current state of the messaging application and the shared synchronization database. For example, the messaging client application 104 retrieves notification information from the shared synchronization data 207 (that was provided by the third-party application 105) and generates a vector of sequence numbers of messages currently stored in the messaging client application 104. The messaging client application 104 determines whether the sequence numbers in the shared synchronization data 207 are different (and are earlier or later) than the sequence numbers in the vector previously generated by the messaging client application 104.

At operation 504, the computing system, such as the client device 102, retrieves information from the shared synchronization database to update the current state of the messaging application based on the identified difference. For example, the messaging client application 104 on the client device 102 retrieves one or more messages corresponding to sequence numbers that are stored in the shared synchronization data 207 (as provided by the third-party application 105) but that are not in the vector of sequence numbers generated by the messaging client application 104.

At operation 505, the computing system transmits via the messaging application to the server, a request for content based on the update to the current state of the messaging application. For example, the messaging client application 104 requests that the server provide messages with sequence numbers that are not in the updated messaging client application 104. Specifically, the messaging client application 104 requests that the server provide updates or synchronize content of the messaging client application 104 that has not been provided already to the client device 102 by other means, such as via the third-party application 105. Namely, if the third-party application 105 received third and fourth messages in a communication session that have not been received by the messaging client application 104, the messaging client application 104 can retrieve such third and fourth messages from the local shared synchronization data 207. Then, the messaging client application 104, when performing a synchronization operation with the server, need not request that the third and fourth messages be provided. Instead, the messaging client application 104 requests that the server provide any messages that came after the third and fourth messages. In short, the messaging client application 104 performs two synchronization operations. First, the messaging client application 104 updates its state by synchronizing its content based on a local synchronization operation using content stored in the shared synchronization data 207. Second, the messaging client application 104 synchronizes its state (as updated by the first synchronization operation) by performing a remote synchronization operation with the server, such as the messaging server system 108, to synchronize content with content stored on the server.

Figure 6:
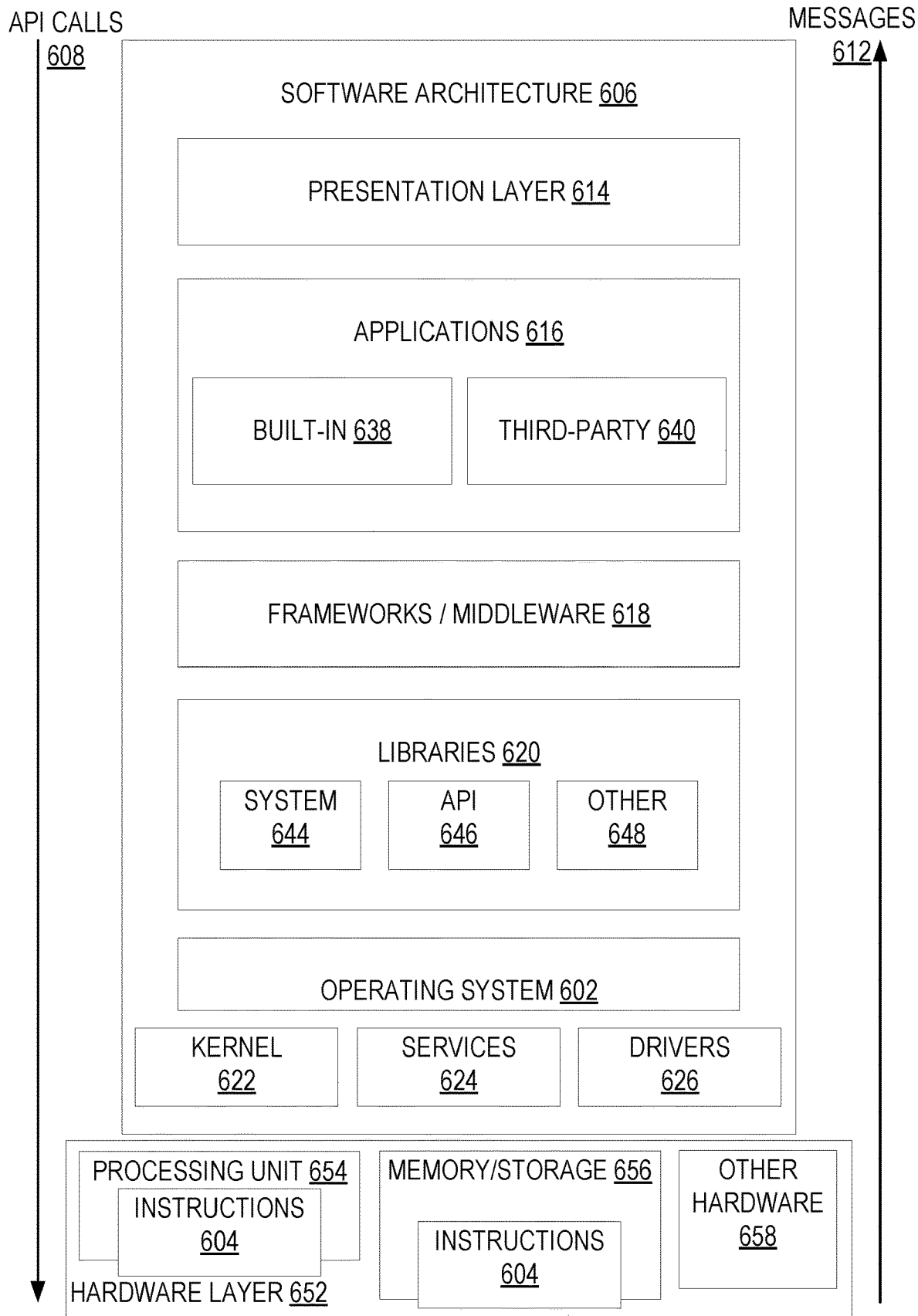
FIG. 6 is a block diagram illustrating a representative software architecture, which may be used in conjunction with various hardware architectures herein described, according to example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
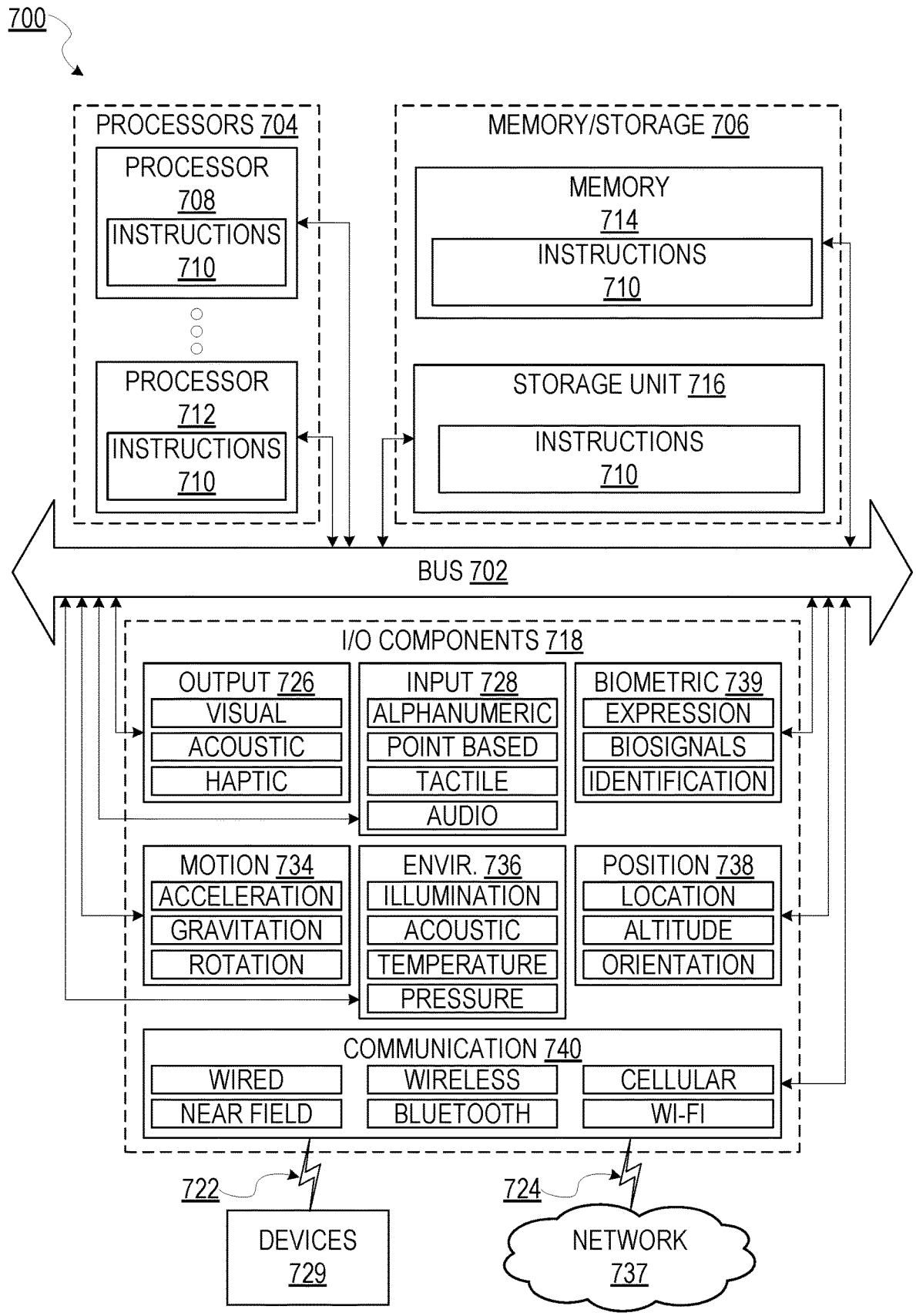
FIG. 7 is a block diagram illustrating components of a machine able to read instructions from a machine-readable medium (e.g., a machine-readable storage medium) and perform any one or more of the methodologies discussed herein, according to example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor 708 with a single core, a single processor 708 with multiple cores (e.g., a multi-core processor), multiple processors 708, 712 with a single core, multiple processors 708, 712 with multiple cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 729 may be another machine 700 or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting a NFC beacon signal that may indicate a particular location, and so forth.

Glossary:

"CARRIER SIGNAL," in this context, refers to any intangible medium that is capable of storing, encoding, or carrying transitory or non-transitory instructions 710 for execution by the machine 700, and includes digital or analog communications signals or other intangible medium to facilitate communication of such instructions 710. Instructions 710 may be transmitted or received over the network 106 using a transitory or non-transitory transmission medium via a network interface device and using any one of a number of well-known transfer protocols.

"CLIENT DEVICE," in this context, refers to any machine 700 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 708 or other programmable processor. Once configured by such software, hardware components become specific machines (or specific components of a machine 700) uniquely tailored to perform the configured functions and are no longer general-purpose processors 708. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor 708 or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 708 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 106 (e.g., the Internet) and via one or more appropriate interfaces (e.g., an API). The performance of certain of the operations may be distributed among the processors, not only residing within a single machine 700, but deployed across a number of machines. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR," in this context, refers to any circuit or virtual circuit (a physical circuit emulated by logic executing on an actual processor 708) that manipulates data values according to control signals (e.g., "commands," "op codes," "machine code," etc.) and which produces corresponding output signals that are applied to operate a machine 700. A processor 708 may, for example, be a CPU, a RISC processor, a CISC processor, a GPU, a DSP, an ASIC, a RFIC or any combination thereof. A processor 708 may further be a multi-core processor having two or more independent processors 704 (sometimes referred to as "cores") that may execute instructions 710 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   establishing a communication session between a plurality of user devices; and
   identifying a difference between a current state of an application and a shared synchronization database, the shared synchronization database storing identifiers of one or more content items exchanged in the communication session, the shared synchronization database storing a matrix comprising a plurality of vectors, a first vector of the plurality of vectors being associated with a first user device of the plurality of user devices, the first vector storing a first set of sequence numbers of content items sent by the first user device, a second vector of the plurality of vectors being associated with a second user device of the plurality of user devices, the second vector storing a second set of sequence numbers of content items sent by the second user device.

2. The method of claim 1, further comprising:
   receiving, by an external application from a server, as a notification, a content item corresponding to the communication session of the application implemented on the first user device; and
   presenting, by the external application, the content item on the first user device while the application is inactive, the application not being informed about the content item that has been presented on the first user device.

3. The method of claim 1, further comprising:
   retrieving information from the shared synchronization database to update the current state of the application based on the identified difference; and
   transmitting, to a server by the application, a request for content based on the update to the current state of the application.

4. The method of claim 1, wherein the shared synchronization database is stored locally on the first user device.

5. The method of claim 1, wherein a first dimension of the matrix represents the plurality of user devices, and wherein a second dimension of the matrix represents sequence numbers of the content items sent by the plurality of user devices, respectively.

6. The method of claim 1, wherein the difference identifies a given content item exchanged in the communication session, further comprising:
   obtaining the given content item from the shared synchronization database; and
   adding the given content item to the communication session of the application.

7. The method of claim 1, further comprising:
   transmitting, to a server, a synchronization request from the application;
   causing the server to identify version information representing an update to the current state of the application;
   causing the server to retrieve current version information of content stored by the server;
   causing the server to identify a set of versions that are later than the version information representing the update to the current state of the application; and
   receiving, from the server, the content corresponding to the set of versions.

8. The method of claim 7, further comprising updating the shared synchronization database based on the received content by updating version information stored in the shared synchronization database.

9. The method of claim 1, wherein identifying the difference comprises:
   generating, by the application, a first vector of sequence numbers;
   retrieving, by the application from the shared synchronization database, a second vector of sequence numbers; and
   identifying one or more sequence numbers that differ between the first and second vectors.

10. The method of claim 9, further comprising accessing an external application to retrieve one or more content items corresponding to the one or more sequence numbers that differ between the first and second vectors.

11. The method of claim 9, wherein each sequence number represents a respective content item sent by a participant in the communication session, and wherein each sequence number is associated with a participant identifier of the participant that sent the respective content item.

12. The method of claim 1, further comprising:
    establishing, at a previous time, the communication session on the first user device comprising a first set of content items received from a server;
    ending a synchronization session with the server after establishing the communication session at the previous time;
    receiving, by the first user device, as a notification, a second set of content items in the communication session by an external application;
    identifying, as the difference, identifiers of a third set of content items exchanged in the communication session after the previous time, the third set of content items corresponding to a subset of the second set of content items that is different from the first set of content items; and
    updating the current state of the application using the identifiers of the third set of content items.

13. The method of claim 12, further comprising:
    causing the server to identify a fourth set of content items that differ from the first set of content items and the second set of content items; and
    receiving, from the server, the fourth set of content items.

14. The method of claim 1, wherein an external application comprises a dedicated application on an operating system of the first user device configured to receive push notifications for a plurality of applications implemented on the first user device, the plurality of applications including the application.

15. The method of claim 1, further comprising:
    receiving a new content item from a given user;
    identifying a given vector of the plurality of vectors associated with the given user;
    generating a new sequence number for the new content item by incrementing a value of a last sequence number stored in the given vector; and
    storing the new sequence number in the given vector for the given user.

16. A system comprising:
    at least one processor configured to perform operations comprising:
    establishing a communication session between a plurality of user devices; and identifying a difference between a current state of an application and a shared synchronization database, the shared synchronization database storing identifiers of one or more content items exchanged in the communication session, the shared synchronization database storing a matrix comprising a plurality of vectors, a first vector of the plurality of vectors being associated with a first user device of the plurality of user devices, the first vector storing a first set of sequence numbers of content items sent by the first user device, a second vector of the plurality of vectors being associated with a second user device of the plurality of user devices, the second vector storing a second set of sequence numbers of content items sent by the second user device.

17. The system of claim 16, the operations comprising:

receiving, by an external application from a server, as a notification, a content item corresponding to the communication session of the application implemented on the first user device; and presenting, by the external application, the content item on the first user device while the application is inactive, the application not being informed about the content item that has been presented on the first user device.

18. The system of claim 16, further comprising operations for:

retrieving information from the shared synchronization database to update the current state of the application based on the identified difference; and transmitting, to a server by the application, a request for content based on the update to the current state of the application.

19. The system of claim 16, wherein the difference identifies a given content item exchanged in the communication session, and the operations comprise:

obtaining the given content item from the shared synchronization database; and adding the given content item to the communication session of the application.

20. A non-transitory machine-readable storage medium that includes instructions that, when executed by one or more processors of a machine, cause the machine to perform operations comprising:

establishing a communication session between a plurality of user devices; and identifying a difference between a current state of an application and a shared synchronization database, the shared synchronization database storing identifiers of one or more content items exchanged in the communication session, the shared synchronization database storing a matrix comprising a plurality of vectors, a first vector of the plurality of vectors being associated with a first user device of the plurality of user devices, the first vector storing a first set of sequence numbers of content items sent by the first user device, a second vector of the plurality of vectors being associated with a second user device of the plurality of user devices, the second vector storing a second set of sequence numbers of content items sent by the second user device.

* * * * *